US008104399B2

(12) United States Patent
Levie

(10) Patent No.: US 8,104,399 B2
(45) Date of Patent: Jan. 31, 2012

(54) STUFFING CAGE HINGED FOR EASE OF ACCESS

(75) Inventor: Mark Levie, Ross, CA (US)

(73) Assignee: Mark Levie, Ross, CA (US)

( * ) Notice: Subject to any disclaimer, the term of this patent is extended or adjusted under 35 U.S.C. 154(b) by 724 days.

(21) Appl. No.: 12/131,398

(22) Filed: Jun. 2, 2008

(65) Prior Publication Data

US 2008/0295707 A1 Dec. 4, 2008

Related U.S. Application Data

(60) Provisional application No. 60/941,137, filed on May 31, 2007.

(51) Int. Cl.
*A23B 4/02* (2006.01)

(52) U.S. Cl. ............... 99/494; 99/415; 99/416; 99/418; 99/419; 99/431; 99/400; 99/401; 99/394; 99/421 V

(58) Field of Classification Search ............... 99/415, 99/416, 418, 431, 419–421 V, 349, 494, 426, 99/250, 444–450, 400, 401, 394, 340; 383/76, 383/77, 117, 8
See application file for complete search history.

(56) References Cited

U.S. PATENT DOCUMENTS

| | | | | | |
|---|---|---|---|---|---|
| 1,514,624 | A | * | 11/1924 | Leon | 119/469 |
| 1,632,380 | A | * | 6/1927 | Marcus | 119/467 |
| 1,649,902 | A | * | 11/1927 | Johnson | 119/462 |
| 1,680,185 | A | * | 8/1928 | Viewegh | 119/459 |
| 1,828,668 | A | * | 10/1931 | Kern | 426/413 |
| 1,853,214 | A | * | 4/1932 | Little | 119/469 |
| 1,874,708 | A | * | 8/1932 | Palubiak | 119/329 |
| 1,926,664 | A | * | 9/1933 | Babitzky | 119/460 |
| 2,693,786 | A | * | 11/1954 | Babros et al. | 119/459 |
| 2,938,450 | A | * | 5/1960 | Carpenter et al. | 99/427 |
| 3,392,665 | A | * | 7/1968 | Harnest | 99/426 |
| 3,565,339 | A | * | 2/1971 | Curran et al. | 239/60 |
| 3,683,857 | A | * | 8/1972 | Yellin | 119/461 |
| 3,691,935 | A | * | 9/1972 | Spetz | 99/327 |
| 4,027,583 | A | * | 6/1977 | Spanek et al. | 99/421 H |
| D260,565 | S | * | 9/1981 | Biro et al. | D30/115 |
| D266,747 | S | * | 11/1982 | Gilford | D11/2 |
| D270,608 | S | * | 9/1983 | Spanek et al. | D7/409 |
| 4,450,759 | A | * | 5/1984 | Steibel | 99/419 |
| 4,557,188 | A | * | 12/1985 | Spanek | 99/415 |
| 4,688,477 | A | * | 8/1987 | Waltman | 99/427 |
| 4,709,626 | A | * | 12/1987 | Hamlyn | 99/426 |
| D293,946 | S | * | 1/1988 | Grant | D30/115 |
| D301,253 | S | * | 5/1989 | Hunt | D20/3 |
| 5,081,916 | A | * | 1/1992 | Kuhling et al. | 99/419 |
| 5,106,642 | A | * | 4/1992 | Ciofalo | 426/509 |
| D343,549 | S | * | 1/1994 | Marshall, Jr. | D7/409 |

(Continued)

*Primary Examiner* — Henry Yuen
*Assistant Examiner* — Brett Spurlock
(74) *Attorney, Agent, or Firm* — Pearne & Gordon LLP

(57) ABSTRACT

A cage for holding a filling material includes a housing have a first part and a second part. An orifice is defined between the first part and the second part for holding a filling material. The housing is shaped in a manner such that is it insertable inside a cavity and has an open position in which filling material may be inserted into the orifice. The housing also has a closed position in which the filling material is trapped within the orifice. The housing is cage-like for holding the filling material. The housing may include a handle, hinges for joining the first and second parts, and a latching mechanism for latching the first and second parts together.

19 Claims, 7 Drawing Sheets

U.S. PATENT DOCUMENTS

| | | | | |
|---|---|---|---|---|
| 5,325,767 A * | 7/1994 | Beller | | 99/421 R |
| D363,000 S * | 10/1995 | Buff, IV | | D7/409 |
| 5,528,984 A * | 6/1996 | Saurwein | | 99/482 |
| 5,842,409 A * | 12/1998 | Loffler et al. | | 99/421 V |
| 5,957,039 A * | 9/1999 | Secord | | 99/349 |
| 6,125,739 A * | 10/2000 | Jernigan | | 99/345 |
| 6,467,399 B1 * | 10/2002 | Boutte | | 99/347 |
| 6,553,896 B1 * | 4/2003 | Heide | | 99/347 |
| D493,066 S * | 7/2004 | Hester | | D7/409 |
| D517,681 S * | 3/2006 | Butler | | D23/403 |
| 7,258,063 B2 * | 8/2007 | Kiplinger et al. | | 99/426 |
| 7,339,136 B2 * | 3/2008 | Schmanski | | 219/386 |
| 2006/0219101 A1 * | 10/2006 | McIlwee et al. | | 99/419 |

* cited by examiner

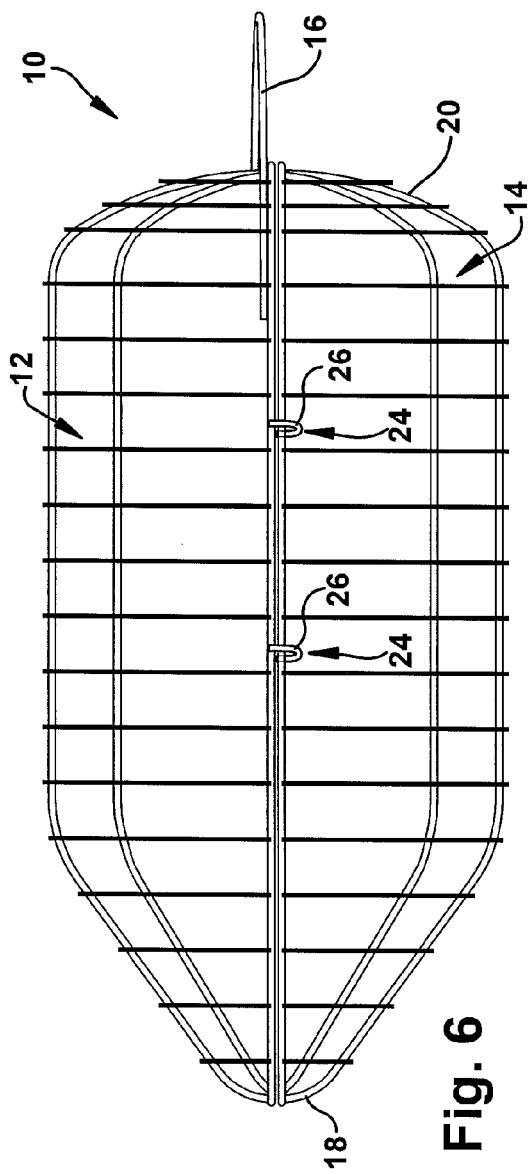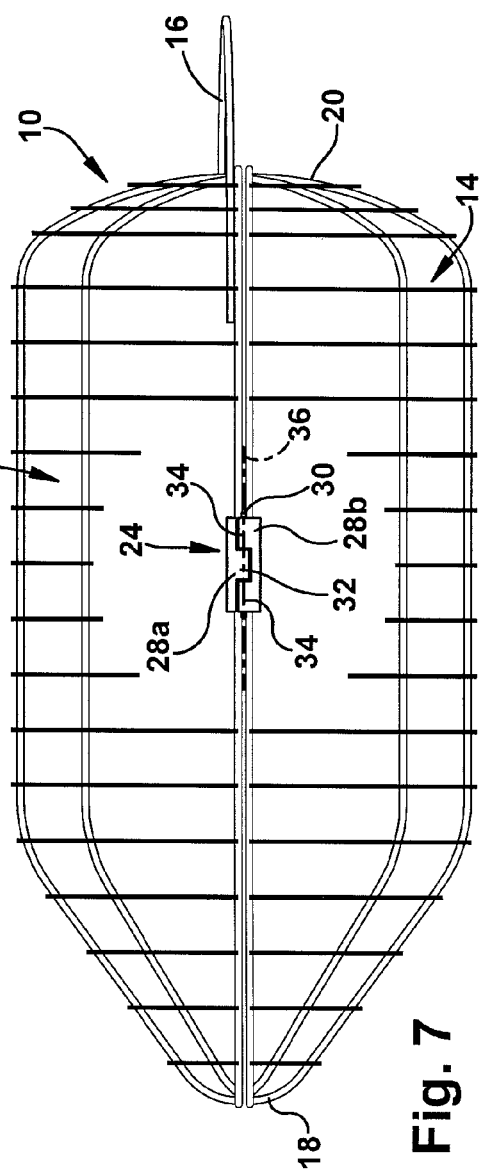

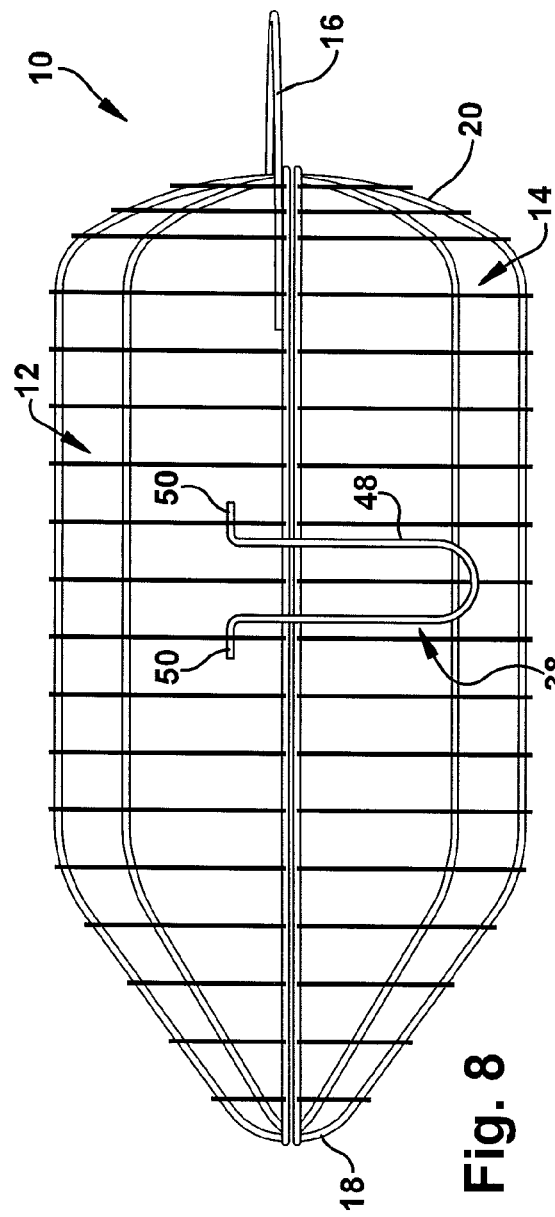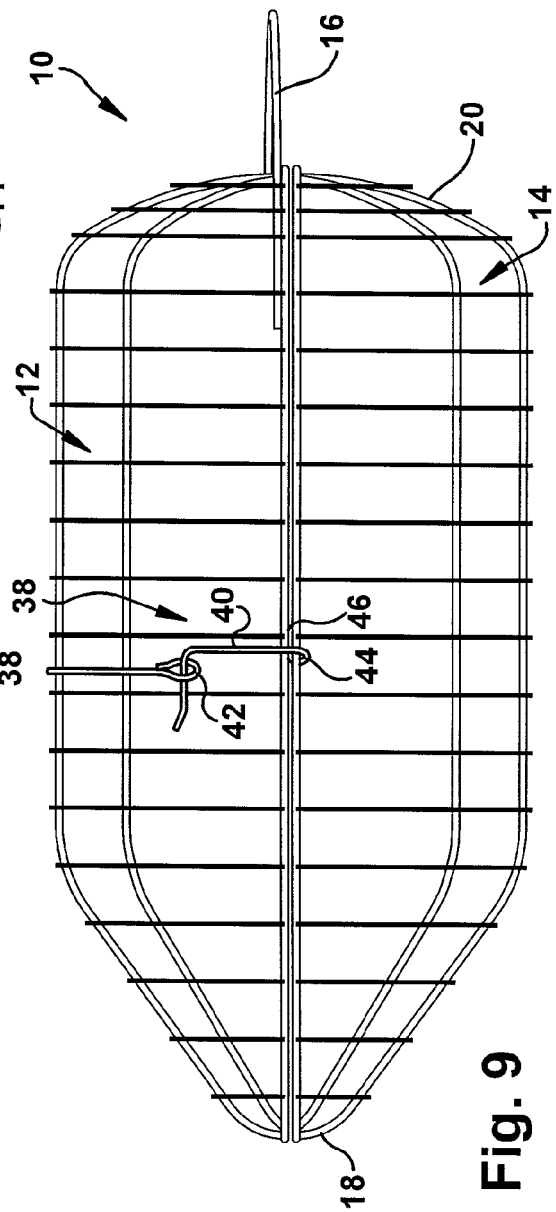

STUFFING CAGE HINGED FOR EASE OF ACCESS

CROSS-REFERENCE TO RELATED APPLICATION

This application claims priority to U.S. Provisional Application No. 60/941,137, filed May 31, 2007, the disclosure of which is incorporated herein by reference in its entirety.

FIELD

This technology relates to a cage or container that can be inserted into poultry or other meat cavity.

BACKGROUND

Stuffing a turkey is often a messy ordeal at holiday time. Traditionally, a preparer takes the stuffing or filling and inserts it manually into the inner cavity of a turkey using a spoon and presses the stuffing into the cavity of the turkey until it appears to be full. During the cooking process, stuffing often falls out of the cavity into the cooking pan. Stuffing is also difficult to remove from the cavity and is often removed one spoonful at a time, making the process tedious and imprecise.

SUMMARY

In accordance with the teachings described herein, a stuffing cage is disclosed.

BRIEF DESCRIPTION OF THE DRAWING FIGURES

FIG. 6 is a schematic side view of the example assembled stuffing cage of FIG. 1 with a first hinge configuration;

FIG. 7 is a schematic side view of the example assembled stuffing cage of FIG. 1 with a second hinge configuration;

FIG. 8 is a schematic side view of the example assembled stuffing cage of FIG. 1 with a first latching configuration;

FIG. 9 is a schematic side view of the example assembled stuffing cage of FIG. 4 with a second latching configuration;

DETAILED DESCRIPTION

Figure 12:
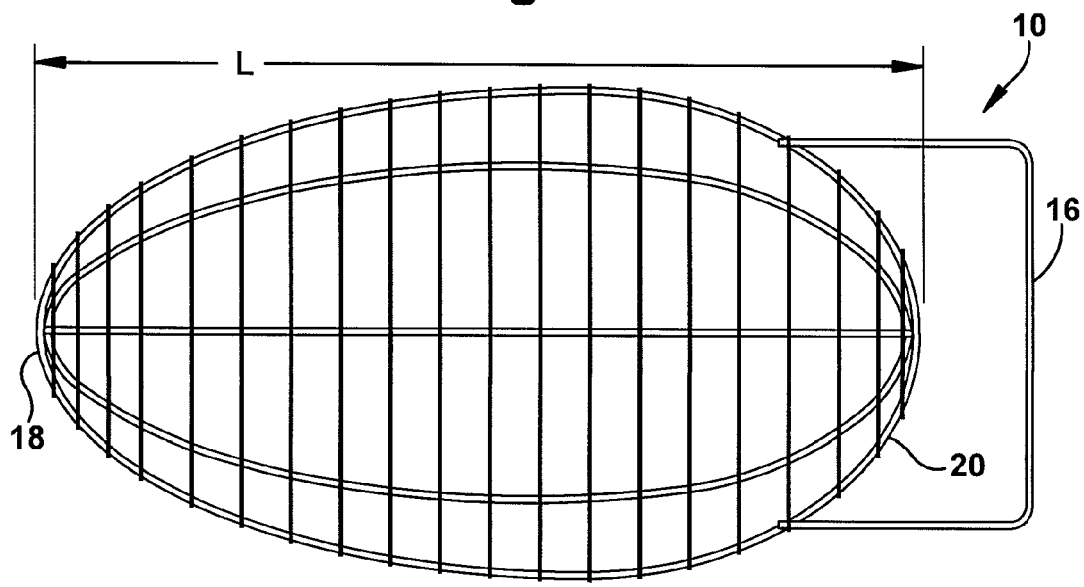
FIG. 12 is a schematic top view of another alternative example stuffing cage, showing a more rounded design with a square handle.

An example stuffing cage 10 for use in stuffing poultry or other meat cavities is depicted in FIG. 1-12. The stuffing cage has a first half 12, a second half 14, a handle 16, a tip 18 and a rear 20. The first half and the second half 12, 14 are cage-like and designed to hold a filling material inside an inner orifice 22 of the cage 10. The example cage 10 shown in FIGS. 1-11 has a bullet shape, with a cylindrical body and a pointed tip 18 and a flattened rear end 20. A rounded handle 16 is coupled to the second half 14 of the rear end 20. The handle 16 is used to pull the stuffing cage 10 from a cavity when the filling material has been cooked. An alternative shape is shown in FIG. 12 for a stuffing cage 10 that has a more oval shape, egg-like shape. This example also has a flattened rear end 20 and a rounded tip 18, but the body of the cage tapers from wider toward the rear 20 to narrower at the tip 18. A square handle 16 is coupled to the cage 10 in this example.

In both examples, the first half 12 of the stuffing cage 10 is coupled to the second half 14 to surround the inner orifice 22 via a hinging mechanism 24. While any type of hinging mechanism 24 may be used, hook hinges 26, as shown best in FIG. 6, are an easy, useful hinge for this purpose since metal associated with one half of the cage loops or hooks around the other half of the cage 10 to couple the first and second halves 12, 14 together. The hooks 26 may be welded to the cage 10 of one of the halves 12, 14, may extend from parts of the cage 10, or may be otherwise coupled to the cage 10.

A second type of hinge mechanism is shown best in FIG. 7 in the form of a two part hinge 28 with a connecting pin 30. One part of the hinge 28a is connected to the first half 12 and the second part of the hinge 28b is connected to the second half 14. The first part of the hinge 28a has a center tubular portion 32 and the second part 28b has two center tubular portions 34 that, when assembled, form a channel for receiving the connecting pin 30. The connecting pin 30 creates a pivot line 36 about which the first and second halves 12, 14 pivot relative to one another. The first and second parts of the hinge 28a, 28b may be coupled to the cage 10 by welding or otherwise, as known by those of skill in the art. Other types of hinge mechanisms may alternatively be utilized.

Figure 1:
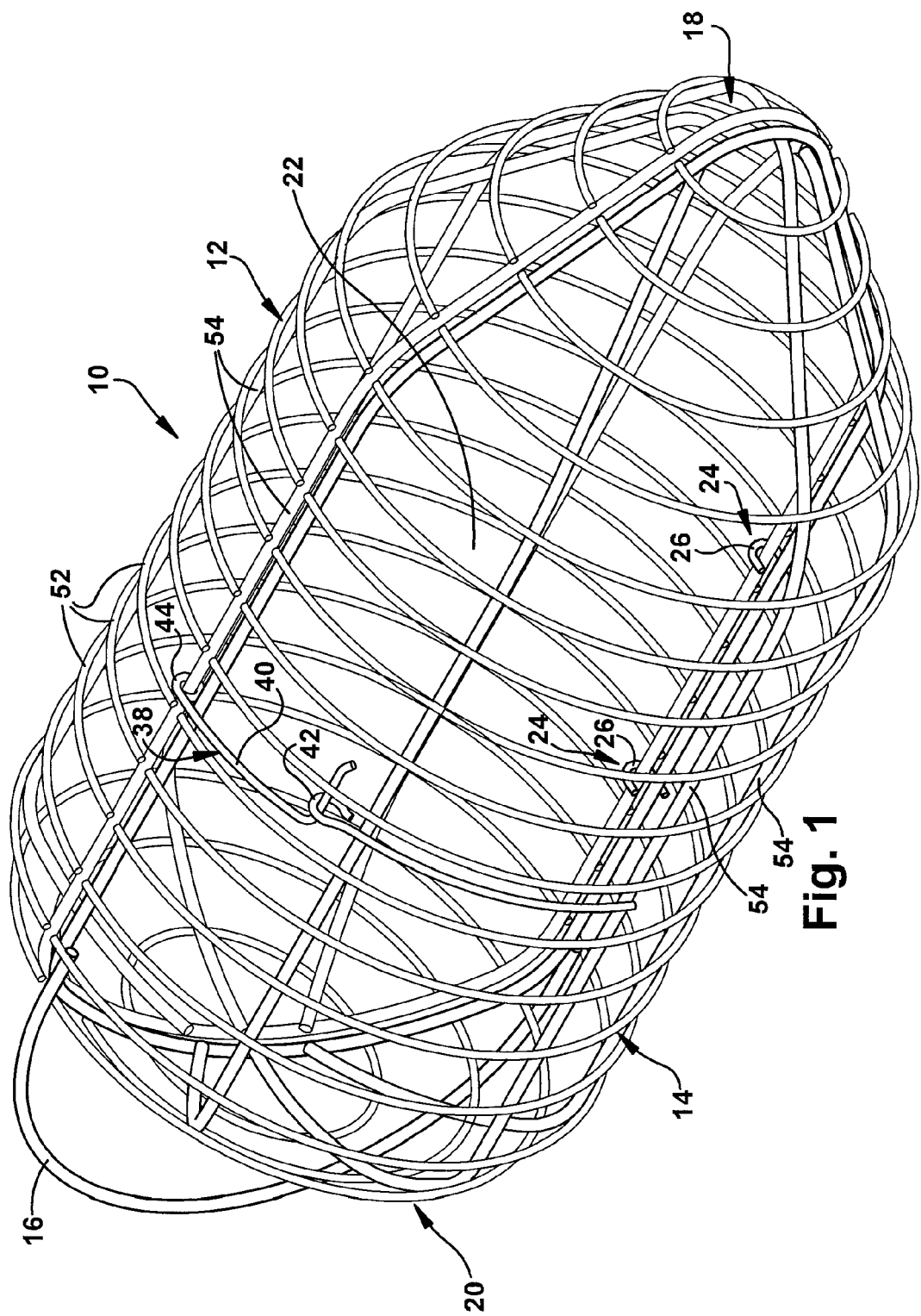
FIG. 1 is a perspective view of an example assembled stuffing cage.
Figure 2:
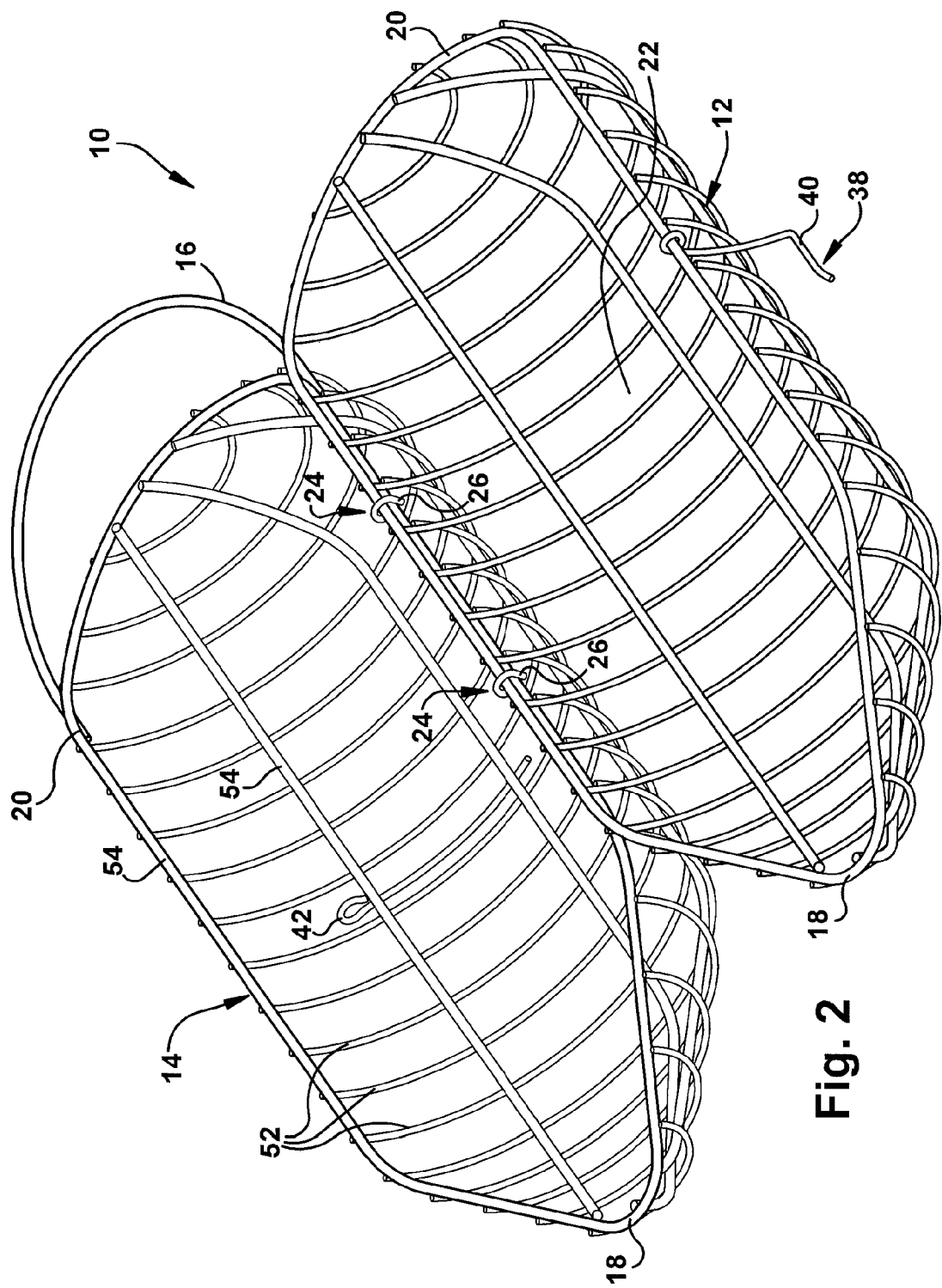
FIG. 2 is a perspective view of the example stuffing cage of FIG. 1 in an open position, showing the inner orifice of the cage.
Figure 3:
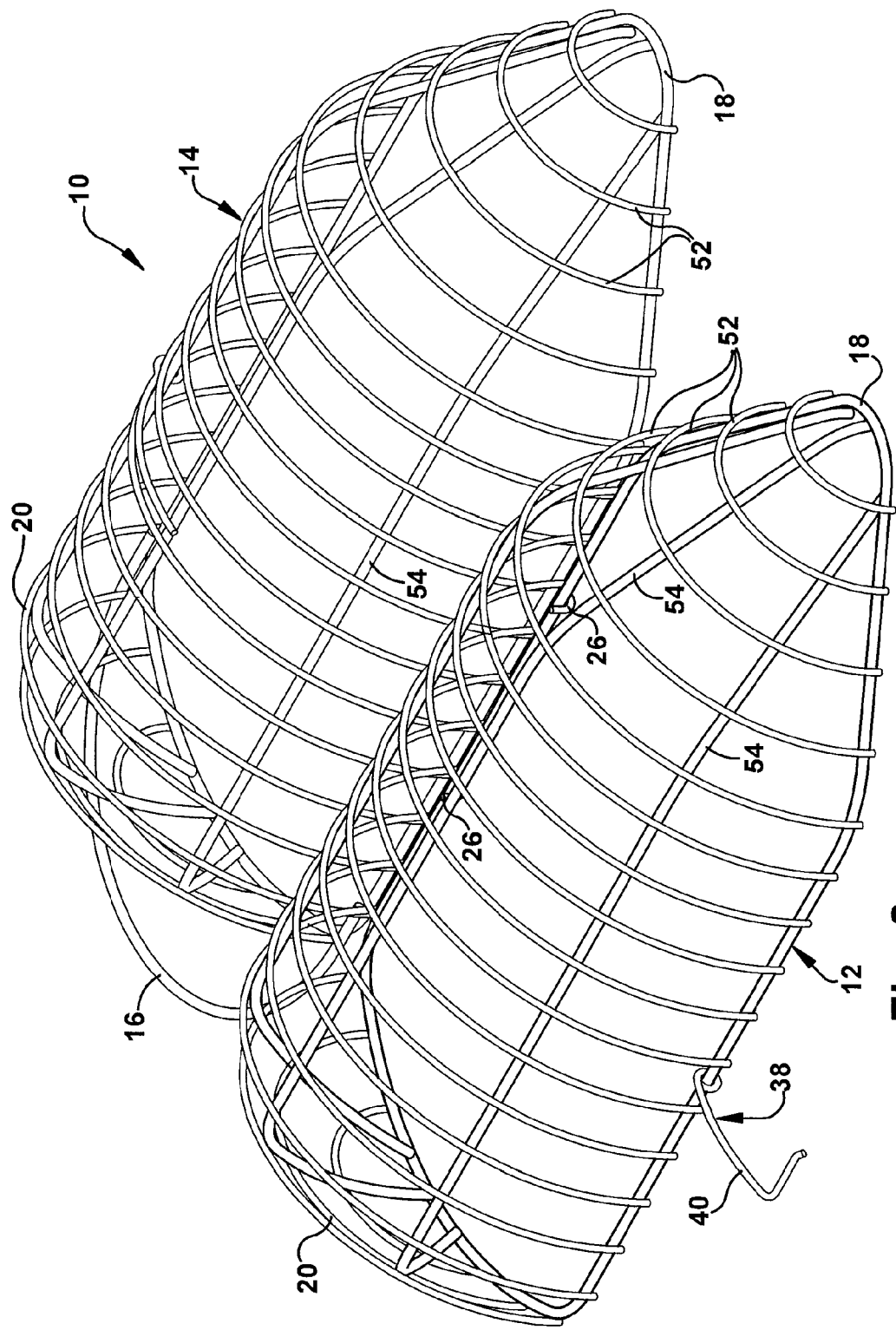
FIG. 3 is a perspective view of the example stuffing cage of FIG. 1 in an open position, showing the outer side of the cage.
Figure 4:
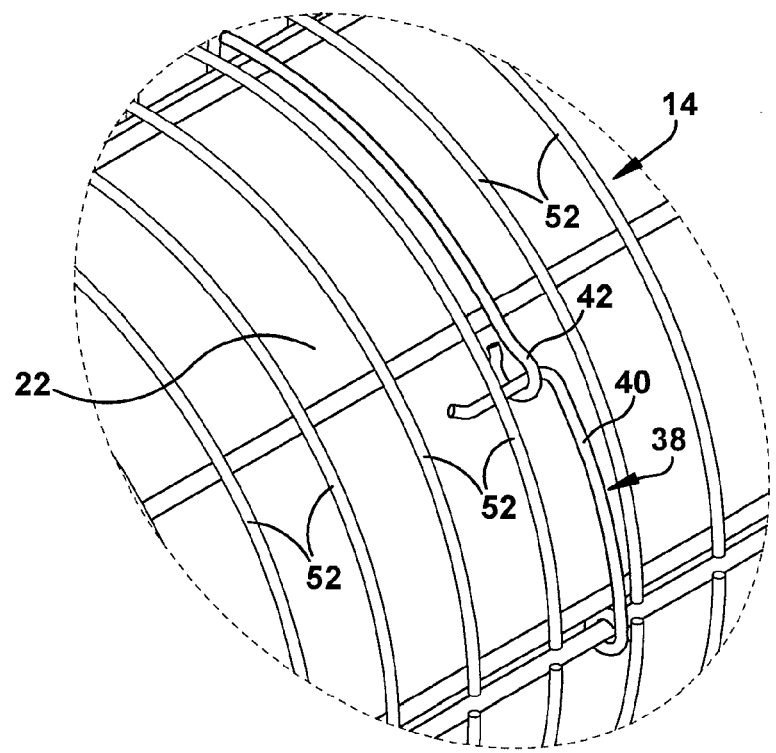
FIG. 4 is a close-up perspective view of the latching mechanism for latching the cage in a closed position.

A latching mechanism 38, shown best in FIGS. 1, 4, and 8-9 is used to couple the first and second halves 12, 14 in a closed position. The latching mechanism 38 may comprise a hook 40 and a loop 42, shown in FIGS. 1, 4, and 9, with the hook 38 being coupled to one half 12 of the cage 10 and the loop 42 being coupled to a second half 14 of the cage 10. The hook 40 is insertable into the loop 42 to hold the two halves 12, 14 together when the first and second halves are closed together. The hook 40 and loop 42 may be coupled to the cage 10 by welding or by other known means. The hook 40 is preferably movable so that it can rotate into and out of the locked position. One technique for coupling the hook 40 to the cage 10, as shown in FIG. 4, is via a loop 44 around the outer rim 46 of the second half 14. The loop 44 forms a pivot point about which the hook 40 is rotatable. The hook 40 could be welded to the body of the cage 12, provided that the hook 40 has some flexibility to allow it to move into and out of the loop 42. The loop 42 may be a separate part that is welded to the cage 12, or may be formed from one of the existing members of the cage and turned over to form the loop. Other techniques for forming the hook 40 and loop 42 are also anticipated, as known by those of skill in the art.

A second type of latching mechanism is shown in FIG. 8 as comprising a U-shaped hook mechanism 48. The U-shaped hook 48 is coupled at its base to the second part 14 and has two upwardly and outwardly extending arms 50 that are flexible in order to allow the arms 50 to engage parts of the cage 10 of the first half 12. When the U-shaped hook 48 is squeezed together, the arms 50 move inwardly and may be positioned under parts of the cage 10. When the U-shaped hook 48 is released, the arms 50 spring apart and under parts of the cage to hold the two halves 12, 14 together. Other types of hinging mechanisms may also be utilized, as known by those of skill in the art.

The stuffing cage 10 is designed for use in poultry, such as a turkey, a chicken, or other types of fowl. Because different poultry have different sizes, the cage 10 is adaptable depending upon the size of the bird to be stuffed. Different sizes, other than those shown may be easily adapted. The stuffing cage may also be used to stuff other meat cavities, or other cavities, the invention not being limited to use with fowl.

While the stuffing cage 10 is shown as having a first part 12 that is one half of the housing of the cage 10 and a second part 14 that is one half of the housing of the cage 10, the first and second parts 12, 14 do not necessarily have to be one half of the shape of the housing. For example, the first part could comprise a greater circumference of the housing, with the second part serving as a door (not shown).

Figure 5:
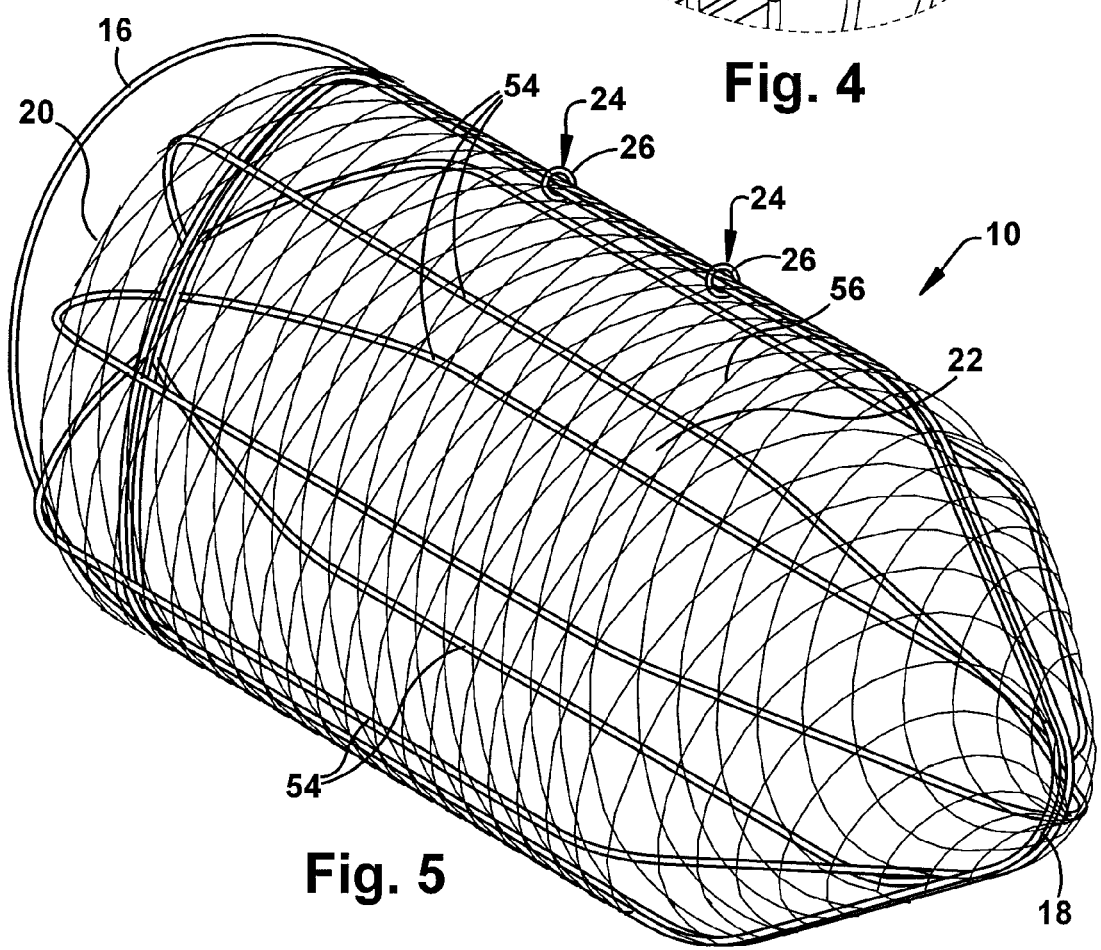
FIG. 5 is a perspective view of an alternative example assembled stuffing cage showing a different type of exterior cage configuration.
Figure 10:
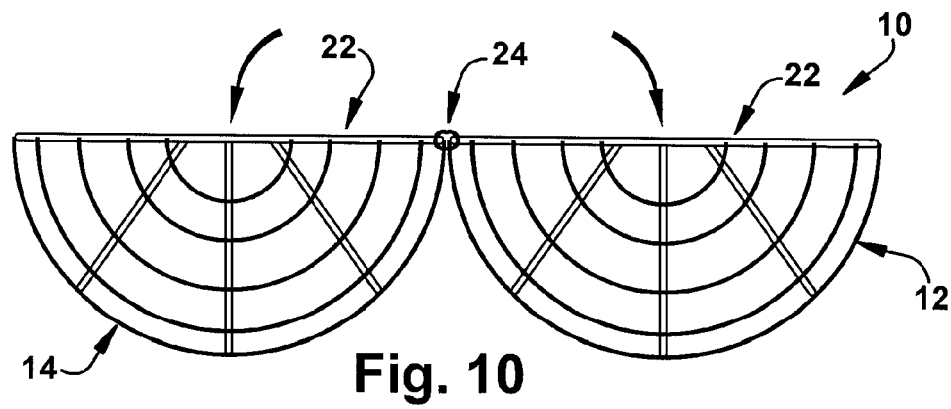
FIG. 10 is a schematic end view of the example stuffing cage of FIG. 1.
Figure 11:
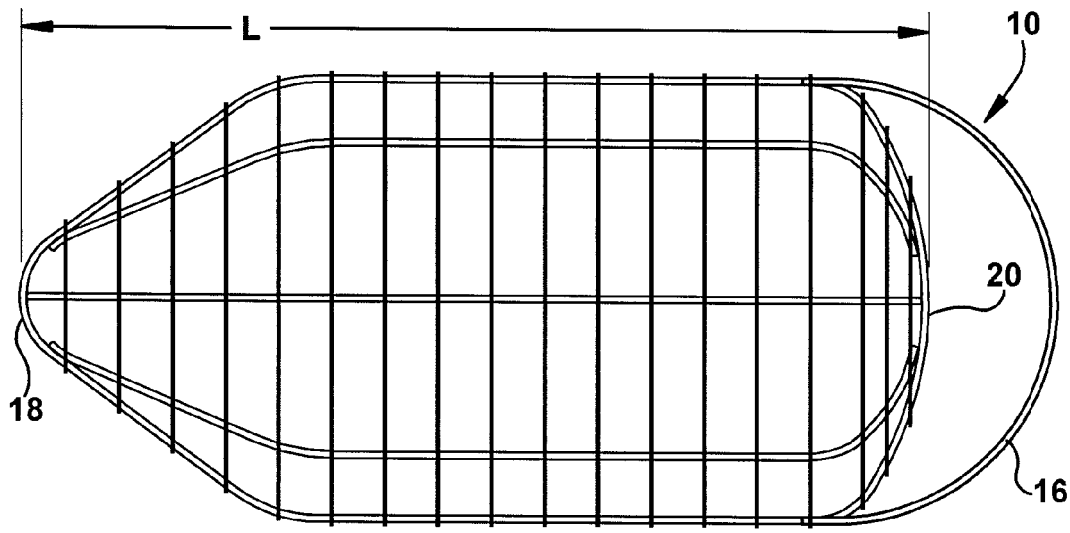
FIG. 11 is a schematic top view of the example assembled stuffing cage of FIG. 1.

FIGS. 1-4 shown a cage design where the exterior of the cage 10 is created by a plurality of spaced ribs 52. The ribs 52 extend vertically in half circles and are coupled to longitudinally extending supports 54. FIG. 5 shows an alternative embodiment where the housing comprises longitudinally extending supports 54 that are covered with a mesh material in order to form the exterior shape of the housing. The mesh material 56 may be coupled to the supports 54 by welding or by any other known means for coupling mesh to a frame. The mesh material 56 serves to hold the filling material in place and has smaller openings than the examples shown in FIGS. 1-4. Any size openings suitable for holding filling material may be used. Other types of mesh and or ribbing may be used to form the interior orifice, the invention not being limited to a particular mesh or spacing size.

The material used as part of the cage or mesh that encloses the inner orifice 22 is oven and food safe. It may be non-stick or coated with a material to render it non-stick. It is preferred that the material utilized not rust and have a long life. Stainless steel and chrome are materials that may be utilized with the example stuffing cage, among other types of materials. A mixture of materials may be used, if desired. Metal and non-metal materials may be used, as long as the materials are designed to withstand temperatures encountered during baking.

In one example, the housing has a length L ranging from about 2 inches to about 20 inches in length and a greatest circumference ranging from about 2 inches to about 20 inches. The handle has a length ranging from about 1 inch to about 5 inches in length. The housing may have a length ranging from about 7 inches to about 9 inches and a greatest circumference ranging from about 12 inches to about 14 inches. The handle may have a length ranging from about 3 to about 4 inches. In one example, the housing has a length of about 8.5 inches, a greatest circumference of about 12 inches, and a handle length of about 2.5 inches. In another example, the housing has a length of about 7.5 inches, a greatest circumference of about 14 inches and a handle length of about 2.5 inches.

While various features of the claimed embodiments are presented above, it should be understood that the features may be used singly or in any combination thereof. Therefore, the claimed embodiments are not to be limited to only the specific embodiments depicted herein.

Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A cage for holding a filling food material inside a food item during cooking comprising:

a housing having a first part that is hinged to a second part along a longitudinal side thereof to allow the first and second parts to separate at an angle about said hinge that is at least an obtuse angle, with an orifice defined between the first part and the second part, said orifice configured for holding a filling food material, said housing being shaped and configured for insertion into and removal from a cavity of the food item during cooking and having an open position in which the filling material is integrally trapped within the orifice;

wherein the housing is an enclosing structure that traps the filling material in the interior orifice thereof during insertion, cooking, and removal of the housing from the cavity of the food item with the first part being rotatable relative to the second part about the hinge to separate the first part from the second part about the hinge and to open the interior of the housing for the insertion or removal of a filling food material therefrom.

2. The cage of claim 1 wherein the hinge comprises at least one hook hinge.

3. The cage of claim 1 wherein the hinge is a two part hinge with a connecting rod for joining the two part hinge together along a pivot axis.

4. The cage of claim 1 further comprising a latching mechanism positioned opposite said hinge, said latching mechanism for holding the first and second parts together when the housing is in the closed position.

5. The cage of claim 4, wherein the latch mechanism comprises a loop and a hook, with the loop being coupled to the first part and the loop being coupled to the second part, wherein the hook is configured to be inserted into the loop.

6. The cage of claim 1, further comprising a handle positioned at one end of the housing.

7. The cage of claim 1, wherein the housing, when in the closed position, has a bullet-like shape, with a tip end of the housing being tapered and a rear end of the housing being rounded.

8. The cage of claim 7, wherein the housing between the tip end and the rear end is substantially cylindrical.

9. The cage of claim 1, wherein the housing, when in the closed position, has an egg-like shape.

10. The cage of claim 1, wherein the first part is a first half and the second part is a second half.

11. The cage of claim 1, wherein the housing is made of a stainless steel grid, a chrome grid, or a mixture thereof.

12. The cage of claim 11, wherein the grid is mesh, with mesh referring to first and second portions of the structure that form at least substantially perpendicular patterns in the enclosing structure.

13. The cage of claim 6, wherein the housing has a length ranging from about 2 inches to about 20 inches in length and a greatest circumference ranging from about 2 inches to about 20 inches, and the handle has a length ranging from about 1 inch to about 5 inches in length.

14. The cage of claim 13, wherein the housing has a length ranging from about 7 inches to about 9 inches, the housing has a greatest circumference ranging from about 12 inches to about 14 inches, and the handle has a length ranging from about 2 to about 4 inches.

15. The cage of claim 13, wherein the housing has a length of about 8.5 inches, a greatest circumference of about 12 inches, and a handle length of about 2.5 inches.

16. The cage of claim 1, wherein the housing has a length of about 7.5 inches and a greatest circumference of about 14 inches.

17. A cage for holding a filling food material inside a food item during cooking comprising:

a housing having a first part that is hinged to a second part along a longitudinal side thereof to allow the first and second parts to separate at an angle about said hinge that is at least an obtuse angle, with an orifice defined between the first part and the second part for holding a filling food material, said housing being shaped and configured for insertion inside a cavity of the food item during cooking and having open position in which filling material is inserted into or removed from the orifice and a closed position in which said filling material is integrally trapped within the orifice, said housing further being shaped and configured for removal from a cavity of the food item;

wherein the housing is an enclosing structure having sufficient surface area defined in a pattern to integrally trap the filling material in the interior orifice thereof during insertion, cooking, and removal from the cavity of the food item and the first part is rotatable relative to the second part about the hinge in order to move the first part away from the second part about the hinge and to open the orifice of the housing to allow the introduction or removal of a filling material into the housing.

18. The cage of claim 17, wherein the housing has an oval shape and the enclosing structure is mesh-like, with mesh-like referring to first and second portions of the structure that form at least substantially perpendicular patterns in the enclosing structure.

19. The cage of claim 17, wherein the housing is made of one or more of non-metallic materials and metallic materials.

* * * * *